US006575831B1

(12) United States Patent
Gonen et al.

(10) Patent No.: US 6,575,831 B1
(45) Date of Patent: Jun. 10, 2003

(54) GAMBLING GAMES

(75) Inventors: Alon Gonen, Haifa (IL); Ishai Shotten, Haifa (IL)

(73) Assignee: CV On Net N.V., Curacao (AN)

( * ) Notice: Subject to any disclaimer, the term of this patent is extended or adjusted under 35 U.S.C. 154(b) by 38 days.

(21) Appl. No.: 09/832,361

(22) Filed: Apr. 10, 2001

(30) Foreign Application Priority Data

Aug. 27, 2000 (IL) ................................................ 138115

(51) Int. Cl.[7] ................................................ A63F 13/00

(52) U.S. Cl. ........................... 463/25; 463/42; 273/292; 273/274

(58) Field of Search .............................. 463/12, 13, 20, 463/25, 42; 273/292, 274, 138.1, 138.2

(56) References Cited

U.S. PATENT DOCUMENTS

| | | | | |
|---|---|---|---|---|
| 5,476,259 A | | 12/1995 | Weingardt | |
| 5,540,444 A | | 7/1996 | Nguyen | |
| 5,823,536 A | | 10/1998 | Flasch | |
| 5,975,528 A | | 11/1999 | Halaby | |
| 5,979,897 A | | 11/1999 | Grossman | |
| 5,984,779 A | | 11/1999 | Bridgeman et al. | |
| 5,999,808 A | | 12/1999 | LaDue | |
| 6,080,063 A | | 6/2000 | Khosla | |
| 6,110,041 A | * | 8/2000 | Walker et al. | 463/20 |
| 6,237,916 B1 | * | 5/2001 | Webb | 273/292 |
| 6,280,328 B1 | * | 8/2001 | Holch et al. | 463/42 |

FOREIGN PATENT DOCUMENTS

| | | | | |
|---|---|---|---|---|
| EP | 1197931 | * | 4/2002 | 463/20 |

* cited by examiner

*Primary Examiner*—Benjamin H. Layno
(74) *Attorney, Agent, or Firm*—Fenster & Company

(57) ABSTRACT

A method of gambling in a casino. The method includes playing one or more gambling games by a user, assigning to the user a banker score responsive to the extent of playing of the one or more gambling games by the user, and offering to the user the position of banker in a casino game, in which one or more players play against the banker and the banker has better odds than the players, responsive to the banker score of the user.

20 Claims, 4 Drawing Sheets

GAMBLING GAMES

FIELD OF THE INVENTION

The present invention relates to gambling games.

BACKGROUND OF THE INVENTION

Gambling games have appeal to many people. Casinos are one of the most popular suppliers of gambling games. Most casinos participate in the gambling and gain money based on the tilted odds of the gambling games which they provide. These tilted odds are one of the reasons casinos are illegal in some countries. That is, many countries allow gambling if it is performed between a plurality of individuals in what is referred to as "pari-mutuel" games. These pari-mutuel games may be organized by a service supplier which receives a commission for providing the game facilities but does not participate in the gambling.

Pari-mutuel games are described, for example, in U.S. Pat. No. 5,476,259 to Weingardt and U.S. Pat. No. 5,984,779 to Bridgeman, et al., the disclosures of which are incorporated herein by reference. In these games, players gamble against an accrued pool from which winner payouts are provided. One of the problems with using accrued pools is that the sum of money in the pool varies and in some instances may be relatively low. Various methods are suggested to keep the pool at relatively constant levels. These methods, however, are complex and tend to alter the rules of the well-known casino games played.

The above-mentioned U.S. Pat. No. 5,476,259 patent describes playing table games, such as twenty-one, craps and baccarat as player-banked games where one player banks and plays against the other players. The U.S. Pat. No. 5,476,259 patent states that player banked games advance noticeably slower than casino banked games and that the allowed wagers in player banked games are often limited due to the credit amount carried by the banker.

U.S. Pat. No. 5,823,536 to Flasch, the disclosure of which is incorporated herein by reference, describes a blackjack table game in which a dealer offers the players of the game to play the roll of the banker. The role of the banker is offered to each of the players according to the order in which the players are seated. Each player may accept or decline the offer. In order to accept the role of the banker and enjoy the favorite odds the casino traditionally enjoys, the player accepting the banker's role must have sufficient funds in order to pay the maximal possible winnings of all the other players. A similar scheme for distributing the role of banker between the players of a different multi-player card game is described in U.S. Pat. No. 5,540,444 to Nguyen, the disclosure of which is incorporated herein by reference.

These schemes for distributing the role of banker are directed to steady groups of players in which the same group of players plays a sequence of rounds. For example, the U.S. Pat. No. 5,540,444 patent relates to sequences of 16 rounds for a group of eight players which each serves as banker for two rounds. Allowing players to join and/or leave the game in the middle of a sequence of rounds tilts the odds of the game and may cause unrest in the casino. In addition, the different sums held by the players of the game cause changes in the maximal wagers which may be offered by users or disqualifies users holding relatively low sums from acting as banker.

In a variation of the scheme of the U.S. Pat. No. 5,823,536 patent, it is suggested to split the banker role between one of the players and the casino, which is represented by the dealer. The wagers paid by the players are divided evenly between the banker player and the casino and the winnings of the players are paid in even parts by the banker player and the casino. Using such a scheme, however, means that the casino is an active (although partial) participant in the gambling. As described above, such participation of the casino in the gambling is undesired.

SUMMARY OF THE INVENTION

An aspect of some embodiments of the present invention relates to a method of managing a casino in which players in the casino are assigned a banker score and the role of banker in the various games of the casino is offered to the players based on their banker score. In some embodiments of the invention, the banker score of a player is a function of the wagers offered by the player in the casino, such that the eligibility of the player to become banker increases with the participation in the games of the casino. Alternatively or additionally, the banker score of a player is a function of the losses of the player in the casino, for example, the total losses of the player in the casino or the losses of the player when not acting as banker. In some embodiments of the invention, the banker score is reduced according to the amount of wagers the player receives when acting as banker.

An aspect of some embodiments of the present invention relates to a method of determining the eligibility of a player to be the banker in a current gambling session, based on actions performed in other gambling sessions. The term gambling session is taken to mean a sequence of consecutive gambling rounds of a single casino game. In some embodiments of the invention, the eligibility to be banker is based on actions performed in previous visits to the casino and/or in other casino games than the game for which eligibility to be banker is being determined. Optionally, the eligibility to be banker is also based on actions of the current gambling session. In some embodiments of the invention, actions in the current gambling session are given higher or lower weight than given to actions in previously played games.

An aspect of some embodiments of the present invention relates to a method of operating casino apparatus (e.g., roulette tables, electronic game machines), in which the entity serving as banker is separate from the entity operating the apparatus. In some embodiments of the invention, the casino apparatus includes software apparatus which simulates the operation of the casino apparatus. Optionally, the software is accessed or provided over a communication network. The entity which provides the software is separate from the entity which serves as banker. In some embodiments of the invention, the casino apparatus includes single-user apparatus in which a single player plays against the banker, e.g., electronic video games and slot machines. Alternatively or additionally, the casino apparatus includes multi-user apparatus such as roulette tables. In some embodiments of the invention, the casino apparatus provides games in which the winning ratios are relatively high, such that the banker may lose in a single round more than 20, 50 or even 100 times the sum which a regular player may lose.

In some embodiments of the invention, the entity serving as banker changes dynamically every several rounds, possibly while one or more players are playing with the apparatus. Optionally, the change in the entity serving as banker is performed without the players using the apparatus noticing and/or without causing a delay between play rounds.

In some embodiments of the invention, a software casino operator rents out casino games to users who serve as bankers. Optionally, the casino games are located in a casino hosting a plurality of casino games rented to different users. Optionally, the user renting the casino games does not bring a group of players but rather leaves the game open for visiting users. In some embodiments of the invention, the casino renting out the games operates the games, i.e., at least partially hosts the software and/or determines the results of game rounds for software games and/or provides an expert dealer for real life card games.

In some embodiments of the invention, the casino games are rented to users who spent at least a predetermined amount of money in the casino, as regular players. Alternatively or additionally, the casino games are rented out for a flat sum and/or a percentage of the wagers and/or winnings of the games.

In some embodiments of the invention, a user renting the game customizes one or more parameters of the game, such as the minimal or maximal wagers and/or the winning odds.

An aspect of some embodiments of the present invention relates to a method of bringing the total gambling odds of a user of a casino to a predetermined value while playing one or more games with fixed odds. At least one of the games with fixed odds having different odds than the predetermined value. In some embodiments of the invention, in playing games which have odds lower than the predetermined odds, the player is assigned game points which allow the user to play a number of rounds in games which have odds higher than the predetermined odds, such that the total odds are equal to the predetermined odds. In some embodiments of the invention, the predetermined odds comprise 50:50 odds. Alternatively or additionally, the odds of each user depend on a payment of the user to the casino and/or to the frequency of playing in the casino.

In some embodiments of the invention, playing the games with odds higher than the predetermined odds comprise playing as banker in known casino games.

An aspect of some embodiments of the present invention relates to a method of playing casino games in which the role of banker is divided between a plurality of users separate from the casino managing the games. In some embodiments of the invention, each of the plurality of users holds a percentage of the banker role, covers that percentage of player winnings and receives that percentage of player wagers. Alternatively, a user may be liable for a first percentage of the losses of the banker and receive a second, different, percent of the wagers. For example, the ratio between the percentage of winnings and the percentage of losses may depend on the user's banker score. Optionally, the percentages of the holdings of the users change automatically responsive to changes in the credit status of one or more of the plurality of users.

There is therefore provided in accordance with an embodiment of the present invention, a method of gambling in a casino, including playing one or more gambling games by a user, assigning to the user a banker score responsive to the extent of playing of the one or more gambling games by the user, and offering to the user the position of banker in a casino game, in which one or more players play against the banker and the banker has better odds than the players, responsive to the banker score of the user.

Optionally, playing one or more gambling games by the user includes playing games against a banker. In some embodiments, playing games against a banker includes playing against other players serving as the banker. In some embodiments, playing one or more gambling games by the user includes playing games which do not include a banker.

In some embodiments, assigning the banker score includes assigning a score which depends on the total wagers of the user in the casino. In some embodiments, assigning the banker score includes assigning a score which depends on the number of rounds played by the user in the casino, on the net losses of the user in the casino, on the previously accrued revenues of the user in acting as banker in the casino and/or on acts in a specific game for which the user wishes to act as banker. Alternatively or additionally, assigning the banker score includes assigning the banker score substantially only based on acts performed in playing the game for which the user wishes to act as banker. Alternatively, assigning the banker score includes assigning the banker score at least partially based on acts in at least one previous session of the user in the casino.

Optionally, the method includes allowing the user to receive or transfer banker points which are added or subtracted from the users banker score. In some embodiments, offering the user the position of banker responsive to the banker score of the user includes offering the position of banker to the user with the highest banker score among a plurality of users interested in acting as banker. In some embodiments, offering to the user the position of banker responsive to the banker score of the user includes offering the position of banker to the user if the banker score of the user is above a predetermined threshold and/or provided the banker has a sufficient amount of credit. Optionally, offering to the user the position of banker includes offering the banker role to a plurality of users, each user receiving a percentage of the banker role. In some embodiments, offering to the user the position of banker includes offering the banker role to an extent which equalizes the winning and losing odds of the user in the casino. In some embodiments, playing the one or more gambling games includes playing software provided gambling games. Optionally, playing software provided gambling games includes playing games provided over a communication network. Optionally, playing one or more gambling games includes playing well-known casino games.

There is further provided in accordance with an embodiment of the invention, a method of managing a gambling game having a banker role and one or more player roles, including registering one or more users in a banker queue of users interested in being bankers of the game, registering one or more users in a player queue of users interested in being players in the game, selecting one or more users from the banker queue and one or more users from the player queue, and playing the game by the selected users, the one or more users from the banker queue performing the banker role and the one or more users from the user queue acting as players.

Optionally, selecting the one or more users from the banker queue includes selecting according to the order of entrance of the users to the queue. In some embodiments, selecting the one or more users from the banker queue includes selecting users according to a banker score which represents for each user the entitlement of the user to serve as the banker. Optionally, selecting the one or more users from the banker queue includes selecting users which did not register recently in the player queue. In some embodiments, playing the game includes playing a single-user game. In some embodiments, playing the game by the selected users includes splitting the role of banker between a plurality of users from the banker queue. Optionally, splitting the banker role between the plurality of users includes splitting responsive to the credit status of one or more of the users. In some embodiments, playing the game includes playing the game with at least one rule parameter of the game determined by at least one of the one or more users from the banker role. Optionally, the at least one rule parameter includes the maximal wager of the game.

There is further provided in accordance with an embodiment of the invention, a method of managing a casino, including allowing a user to play games with one or more gambling odds, and allowing the user to play a limited number of rounds of one or more games with odds higher than predetermined goal odds, so that the total odds of the games played by the user reach the predetermined goal odds. Optionally, the predetermined goal odds include odds of 50:50. In some embodiments, allowing the user to play a limited number of rounds of one or more games with odds higher than the predetermined goal odds includes allowing the user to serve as banker in the one or more games.

There is further provided in accordance with an embodiment of the invention, a method of managing a casino, including allowing a user to play a first game session, including one or more consecutive rounds of a single game, as a player, and allowing the user to play a limited number of rounds of a second game session different from the first game session as a banker, responsive to the playing of the first game session as a player.

Optionally, the second game session occurs a substantial period of time after the user ended to play the first game session. In some embodiments of the invention, the second game session includes playing a different game than played in the first game session.

In some embodiments, the second game session includes playing against at least one player different than played against in the first game session.

There is further provided in accordance with an embodiment of the invention, a method of playing a casino game in a casino, including selecting one or more users with a combined credit in the casino of at least 20 times a maximal wager allowed in the casino game, and playing the casino game by one or more players with the selected one or more users acting as bankers. Optionally, selecting the one or more users includes selecting users with a combined credit of at least 50 or 150 times a maximal wager allowed in the game.

In some embodiments, playing the casino game includes playing a game with odds of winning in a specific round of less than 1:20. In some embodiments, playing the casino game includes playing a game in which the maximal winning in a single round is at least 10 times the wager placed by a player.

There is further provided in accordance with an embodiment of the invention, a method of playing a casino game in a casino, including selecting a plurality of users to operate as banker; and playing the casino game by one or more players with the selected plurality of users acting together as banker. Optionally, the method includes verifying that the combined credit of the selected users is sufficient to cover the maximal possible banker losses of a single game round. In some embodiments, selecting the plurality of users includes repeatedly selecting a user and assigning the selected user a portion of the remaining banker role according to the selected user's credit, until the selected users cover the entire banker role.

There is further provided in accordance with an embodiment of the invention, a method of providing casino apparatus for gambling, including selecting one or more users, not associated with the owner of the casino apparatus, to serve as a banker of the apparatus, and opening the apparatus for receiving wagers from players.

Optionally, the one or more users includes selecting different users at least a plurality times a day. In some embodiments, the casino apparatus includes a software which implements a casino game. Optionally, the method includes customizing one or more parameters of a game using the apparatus by the selected banker.

In some embodiments, the user selected to operate as banker does not pay the owner of the casino apparatus for operating as banker. In some embodiments, the user selected to operate as banker is selected responsive to previous use as a player by the selected user of casino apparatus of the owner. Optionally, the apparatus includes a jackpot game.

There is further provided in accordance with an embodiment of the invention, a method of playing a casino game, including playing a casino game with at least one first player operating as banker and using a first value of at least one rule parameter of the game, selecting at least one second player to operate as banker, determining a second value, different from the first value, of the at least one rule parameter responsive to the selected at least one second player, and playing the casino game with the at least one second player operating as banker and using the second value of the at least one rule parameter of the game.

Optionally, the at least one rule parameter includes a maximal allowed wager. In some embodiments, determining the second value of the at least one rule parameter includes determining responsive to a credit level of the at least one second player.

There is further provided in accordance with an embodiment of the invention, a method of playing a gambling game of a casino, including selecting at least one user to operate as banker, playing a round of the game by one or more players, and automatically passing the wagers of the players, and paying players winnings if any, from an account of the banker, without the user being in communication with the casino or any of the players. In some embodiments, selecting the at least one user to operate as banker includes selecting a user not in communication with the casino or any of the players of the game. Optionally, the method includes receiving instructions from the user selected as banker on the credit limits between which the user is willing to operate as banker. In some embodiments, receiving the instructions includes receiving the instructions before the user was selected to be banker.

There is further provided in accordance with an embodiment of the invention, a computer program for providing gambling games, including a playing module which allows users to play one or more gambling games, a score module which assigns the users a banker score responsive to the extent of playing of the one or more gambling games of the playing module by the users; and a banker selection module which determines which user should receive the role of banker in a casino game, responsive to the banker score of the users.

Optionally, the banker score is influenced only by acts performed in games provided by the playing module which have a banker role or which do not include a banker role.

In some embodiments, the banker score is a function of the extent of playing of a plurality of gambling games provided by the playing module.

Optionally, the banker score is a function of the wagers spent by the user in the games provided by the game module and/or of the wagers received by the user in acting as banker of the games provided by the game module. In some embodiments, the score module allows users to receive or transfer banker points which are added or subtracted from the users banker score.

In some embodiments, the banker selection module selects the user with the highest banker score to act as banker. Optionally, the banker selection module selects a user with a credit level above a predetermined level to act as banker. Optionally, the banker selection module selects a plurality of users which each receive a portion of the banker role.

In some embodiments, the banker selection module allows a user to operate as banker for an amount of game rounds which brings the total odds of the user in playing the games of the playing module to a predetermined level. Optionally, the computer program includes a network interface for providing game information and receiving game instructions from a remote user terminal.

There is further provided in accordance with an embodiment of the invention, a gambling apparatus, including an input interface for receiving indications from users interested in being players in a gambling game and users interested in being banker in the gambling game, and a processor which selects one or more users interested in being banker and one or more users interested in being players, and determines the results of a gambling game in which the one or more users selected from the users interested in being banker perform the banker role and the one or more selected users interested in being players act as players. Optionally, the input interface receives indications over a communication network such as the Internet. In some embodiments, the processor selects substantially all the users from which indications of being interested in being banker were received that have sufficient credit for receiving a respective portion of the banker role.

There is further provided in accordance with an embodiment of the invention, apparatus for managing a casino, including apparatus for playing one or more gambling games with one or more low gambling odds, and a processor which receives information on the extent to which users played the one or more gambling games with the one or more gambling odds and determines an amount for which the users are allowed to play one or more gambling games with one or more high odds, such that the total playing odds of the users reach predetermined goal odds. Optionally, the predetermined goal odds include odds of 50:50. In some embodiments, the apparatus for playing the one or more gambling games includes the processor which receives the information.

There is further provided in accordance with an embodiment of the invention, a computer program for managing a casino, including a playing module which receives wagers, determines game results and provides player winnings; and a banker determination module which determines the eligibility of users to act as banker in game sessions managed by the playing module, at least partially based on acts performed by those users in other game sessions, different from the game sessions for which the eligibility to be banker is determined.

In some embodiments, the banker determination module determines the eligibility based on the sum of wagers provided in the other game sessions.

Optionally, the banker determination module determines the eligibility based on acts performed in different games than the game for which the eligibility to be banker is determined. In some embodiments, the banker determination module determines the eligibility to be banker based on acts of the user performed over a remote communication connection between the user and the playing module, after the communication connection was terminated.

There is further provided in accordance with an embodiment of the invention, apparatus for playing a casino game, including a credit unit which manages credit accounts for users of the casino game, a banker determination unit which selects one or more users with a combined credit of at least 20 times a maximal wager allowed in the casino game, and casino game apparatus which is played by one or more players with the selected one or more users acting as bankers.

In some embodiments, the banker determination unit selects one or more users with a combined credit of at least 150 times the maximal wager allowed in the casino game. In some embodiments, the casino game apparatus includes a jackpot machine or a software simulating a jackpot machine and/or a roulette table or a software simulating a roulette table.

There is further provided in accordance with an embodiment of the invention, apparatus for playing a casino game, including a banker determination unit which selects a plurality of users to operate as banker, casino game apparatus which is played by one or more players with the selected plurality of users acting as bankers.

Optionally, the casino game apparatus includes a server which runs casino games. In some embodiments, the plurality of users operating as banker connect remotely over a communication network to the server. In some embodiments, the plurality of users include at least three users. Optionally, the banker determination unit performs the banker selection by repeatedly selecting a user and assigning the selected user a portion of the remaining banker role according to the selected user's credit, until the selected users cover the entire banker role.

There is further provided in accordance with an embodiment of the invention, apparatus for providing gambling games, including a server which runs a credit module which manages credit accounts of a plurality of users and a game module which selects one or more users to act as banker, simulates one or more casino games, which include a banker role and one or more players, with the selected one or more users acting as bankers, and instructs the credit module to transfer money between the user accounts responsive to the results of the one or more casino games, and a network interface through which users having credit accounts communicate with the server a remote communication network.

Optionally, the game module simulates at least one jackpot game and/or roulette game. In some embodiments, the game module simulates a plurality of games for which different users operate as bankers. In some embodiments, the game module simulates at least one game for which the one or more users operating as banker change at least a plurality of times each day. In some embodiments, the game module receives from at least one of the users selected to operate as banker at least one parameter of the game for which the user operates as banker. Optionally, the user selected to operate as banker is not connected to the network interface.

BRIEF DESCRIPTION OF FIGURES

Particular non-limiting embodiments of the invention will be described with reference to the following description of embodiments in conjunction with the figures. Identical structures, elements or parts which appear in more than one figure are preferably labeled with a same or similar number in all the figures in which they appear, in which.

DETAILED DESCRIPTION OF EMBODIMENTS

Figure 1:
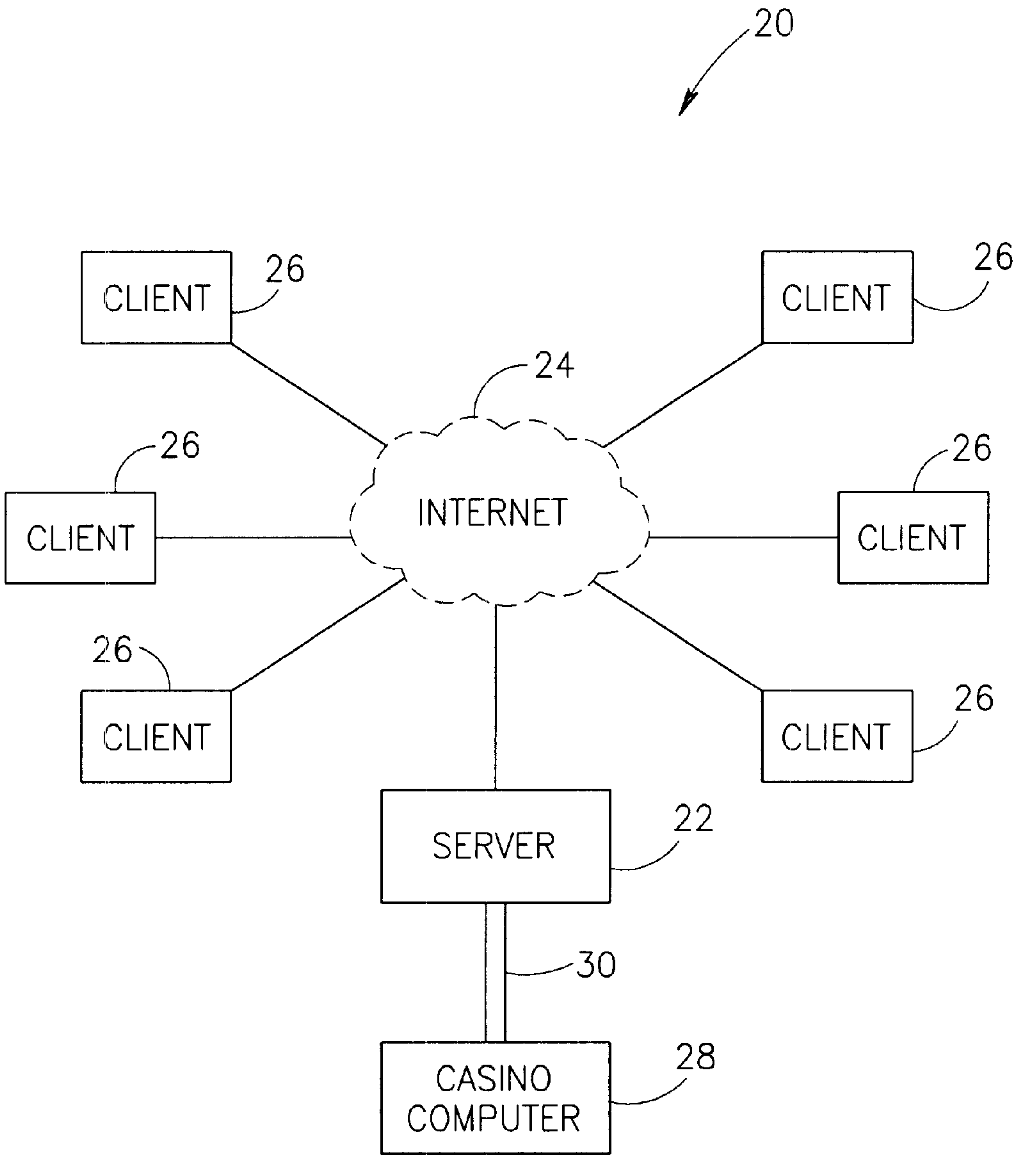
FIG. 1 is a schematic block diagram of a network used for gambling, in accordance with an embodiment of the present invention.

FIG. 1 is a schematic block diagram of a network 20 used for gambling, in accordance with an exemplary embodiment of the present invention. A server 22 is connected through a public network, e.g., the Internet 24, to a plurality of clients 26. Server 22 manages a casino in which users can gamble against each other. In some embodiments of the invention, on the first time a client 26 connects to server 22 it downloads a client software which operates as a user interface to the casino managed by server 22. Alternatively or additionally, the client software is downloaded each time the user wishes to gamble and/or when updates of the software are provided. Optionally, the client software communicates substantially only with server 22 which mediates between clients 26. Alternatively, clients 26 communicate directly with each other and periodically receive updates from, and/or provide updates to, server 22. In some embodiments of the invention in accordance with this alternative, a distributed algorithm is used to determine which of the client softwares on clients 26 determines the results of a game round. Optionally, the client softwares are encrypted in a manner which prevents tampering of users with game results.

In some embodiments of the invention, server 22 receives user input (e.g., wager sums) from clients 26, and provides the client software with game results. Optionally, the communications between server 22 and clients 26 are encrypted to prevent leakage of information and/or tampering with the information. In some embodiments of the invention, server 22 provides monetary assurance to clients 26, such that a winning player is sure that the monetary winnings will be passed to the account of the winning player.

In some embodiments of the invention, server 22 hosts a plurality of casino games which include no-house games, such as poker, multi-user table games, such as craps, baccarat and blackjack, multi-user gambling apparatus games, such as roulette, single-user games, such as video-poker and/or jackpot games, such as slot machine and electronic game machines (EGM). The rules of multi-user table games pertain to one or more players who play against a banker, also known as the dealer or the house. The banker enjoys better odds than the other players. In the casino hosted by server 22, a plurality of players participate in the game and one of the players acts as the banker. The player acting as banker receives the wagers of the players and pays their winnings.

In the single-user games, only a single player bets against the banker which in the casino of server 22 is a player playing the role of the casino. In the no-house games there is no house and these games are played substantially as is known in the art.

The fact that the casino of server 22 does not participate in the bets, adds to the credibility of the casino, as it has no reason to cheat. Thus, players can trust that the advertised winning ratios of the casino are actually the real ratios and there is no tampering with the dice.

In some embodiments of the invention, the multi-user and single-user games of the casino of server 22 comprise well-known casino games which are widely used by casinos and therefore users are accustomed to these games. From the point of view of a player of the game, who is not interested in who pays his/her winnings, these games hosted by server 22 are exactly the same as the well-known games including the ratios of winning and losing.

Alternatively or additionally to hosting well-known games, server 22 may host other known casino games, variations of known casino games or other games with proprietary rules. In some embodiments of the invention, server 22 hosts a plurality of games which have common rules but different allowed ranges of wagers. Alternatively or additionally, the casino includes similar games which differ in the maximal prizes provided and the chances of winning these prizes. For example, the casino may include EGMs with maximal winnings of $100, $200 and $1000.

In some embodiments of the invention, each player entering the casino of server 22, generally through a client 26, is assigned a credit account from which the user pays his wagers and losses and to which the users winnings are entered. In some embodiments of the invention, the user may deposit money in the credit account and/or draw money from the account using any of the methods known in the art, such as using credit cards, cheques, etc.

Optionally, users are allowed credit beyond the money they have in their account. It is noted, however, that such credit is generally limited, especially for newcomers who have not proven prompt payment habits. In some embodiments of the invention, the credit allowed to users beyond sums actually within their account depends on their chances of winning and/or losing. For example, credit required in order to play with slot machines is lower relative to credit required in order to act as banker.

In some embodiments of the invention, each player also has a banker score which determines the eligibility of the player to become a banker in the games hosted by server 22. Methods for determining the banker score are described below.

In some embodiments of the invention, server 22 manages for each user a record which includes one or more fields with user related information. In some embodiments of the invention, the user records include personal information such as the users name, E-mail address, telephone number, address and/or Fax number. Alternatively or additionally, the user records include a nickname with which the user identifies in the casino and/or a password which is required in order to access the user's account. Alternatively, server 22 does not carry any identification information of the users, except the information required for billing the client and allowing access to the casino games. In some embodiments of the invention, the user records include a history of the games played by the user and the results of the games and/or statistical information on the user. Alternatively, server 22 does not record any information on the gambling habits and/or history of users.

In some embodiments of the invention, server 22 connects, via a private network 30, to a casino computer 28 which stores confidential information, e.g., the betting history of users and credit card information, and/or performs delicate tasks which should not be tampered with by hackers, e.g., determining game results. In some embodiments, casino computer 28 is protected by a firewall and/or other protection means to prevent hacker intrusion. It is noted that although in the following description all the tasks of the casino are described as being performed by server 22, some of these tasks may be performed by casino computer 28 in order to enhance the safety of the casino from being manipulated by external hackers. In other embodiments of the invention, some or all of the tasks of server 22 are performed by one or more of client computers 26, selected by a distributed algorithm.

The client software on client 26 optionally displays casino games in a real life fashion using graphic animation and/or sound effects. In some embodiments of the invention, server 22 provides a plurality of client softwares which differ in the language in which they communicate with users and/or in the graphics they display to users. In some embodiments, the user may customize the display shown by the client software and/or the language of the client software. In some embodiments of the invention, the client software may display according to the player's preferences player personal information, game information and/or casino information. Optionally, the player information includes the amount of money in the player's account, the player's banker score and/or recent game logs. The game information optionally includes the names (or nicknames) of the other players, the other player's wagers, the current credit status of the current banker and/or of all the other players and/or the names of the players operating as bankers. The casino information optionally includes the occupancy of the games of the casino and/or special offers of the casino.

Optionally, the client softwares on clients 26 communicate with server 22 using the same protocol and any required language translations are performed by the client software. Alternatively or additionally, server 22 recognizes a plurality of different protocols with which it communicates with different clients 26.

Figure 2:
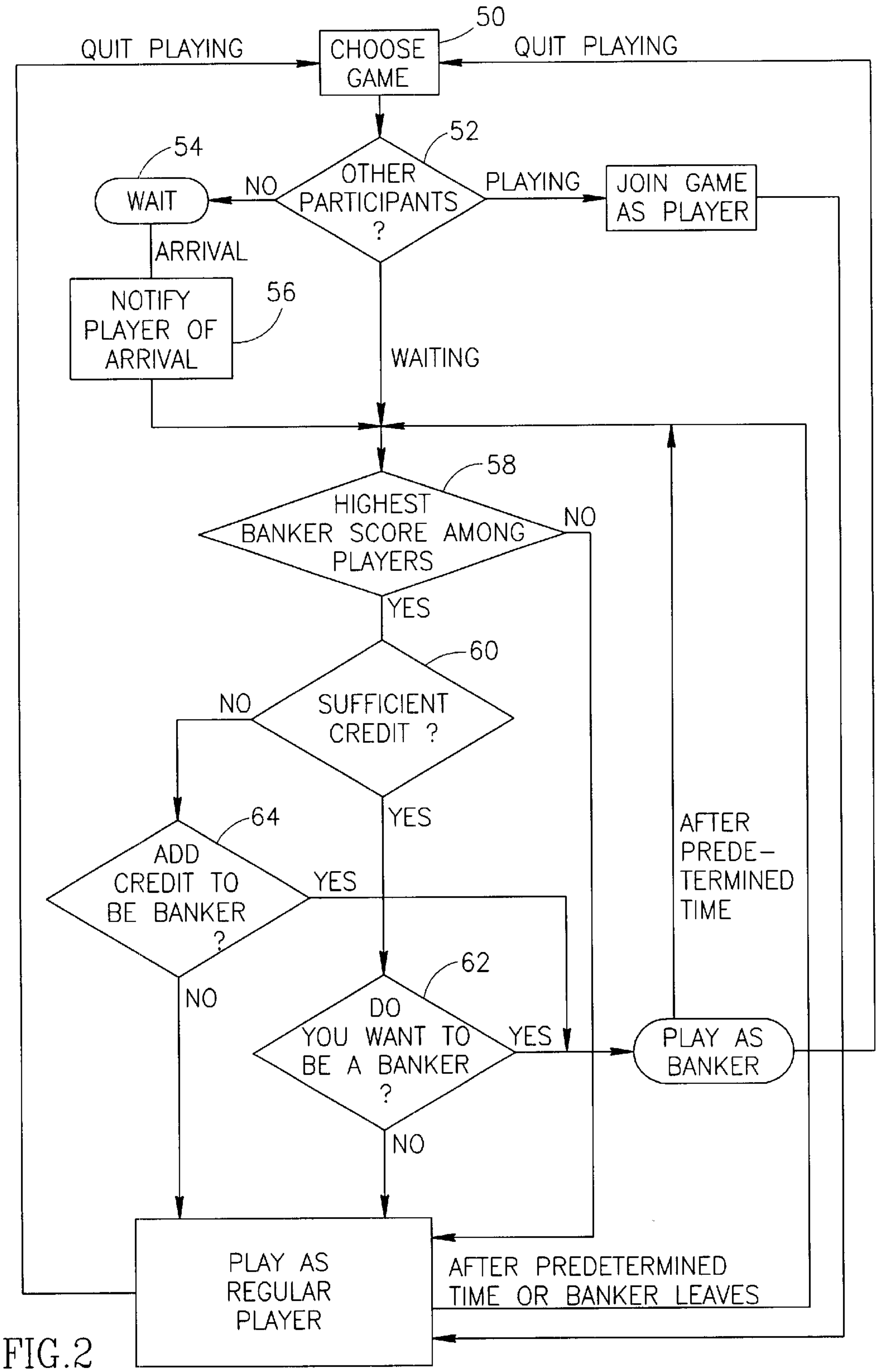
FIG. 2 is a flowchart of the actions performed by a player entering a multi-user casino game, in accordance with an embodiment of the present invention.

FIG. 2 is a flowchart of the actions performed by a player entering a multi-user game in the casino hosted by server 22; in accordance with an embodiment of the present invention. A player entering the casino chooses (50) a game which he/she wishes to play. If (52) no other users are currently playing the game the user registers as interested in playing the game and waits (54). Meanwhile, the user may play a demonstration version of the game which does not involve real monetary bets. Alternatively or additionally, the user may play other games meanwhile. When another user arrives at the game, the waiting user is notified (56). In some embodiments of the invention, the waiting user may request to be notified when at least a predetermined number of users gather at the game. For example, a user may request to join a game of blackjack only when at least four other players wish to play the game. Other players may play the game meanwhile.

When at least two users gather at a multi-user game, server 22 determines (58) which of the gathered users has the highest banker score. Optionally, in case of a tie one of the players with the highest score is chosen randomly. Server 22 checks (60) the credit account of the user with the highest score to determine whether the user has sufficient credit to cover the maximal possible winnings of all the other players during one or more game rounds. If (60) the player with the highest banker score has sufficient credit, the banker role is unconditionally offered (62) to the player. If the player with the highest banker score does not have sufficient credit to serve as banker the player is offered (64) to play as banker under the condition that an additional required sum is immediately added to the player's credit account. Alternatively, players are warned that they lose their chance to operate as banker without notice if they do not have sufficient credit in their account. If the player refuses the banker role, the banker role is offered to the player with the next highest banker score until a player interested in the banker role is found. Alternatively, the banker role is offered in a random (or other) order to player's with at least a predetermined banker score. In this alternative, only if no users with at least the predetermined banker score are interested in the banker role, is the role offered to the user with the highest banker score.

In some embodiments of the invention, if none of the players wishes to be banker, server 22 searches for a user who is willing to join the game and serve as banker. Optionally, server 22 advertises to some or all of clients 26 that a banker is needed for the specific game. Optionally, the first user to volunteer to act as banker is added to the game. Alternatively, the volunteer with the highest banker score is added to the game. If necessary, one of the players, e.g., the last arriving or the player with the highest or lowest banker score, is removed from the game to wait state 54 to make room for the volunteer banker. Optionally, if a player is in wait state 54 beyond a predetermined time, e.g., a period between 0.5 to 2 minutes, an advertisement is sent to at least some of the clients 26, notifying them of the waiting player.

Once a banker is elected, server 22 administers the rounds of the game, accepting wagers, determining round results, optionally with the aid of casino computer 28, and transferring money between the player accounts according to the results of the rounds. In an exemplary embodiment of the present invention, the game results are determined using a random number generation method, such as the pLab project random number generation algorithm of the Mathematic's department of the University of Salzburg or the Blum-Blum-Shub PRNG method. It is noted, however, that substantially any other suitable method for generating random numbers may be used. Alternatively, a hardware device for generating random numbers is used and a suitable interface loads the random numbers into casino computer 28 and/or server 22.

In some embodiments of the invention, after a predetermined number of rounds (one or more), server 22 determines whether the player acting as banker is still eligible to be banker according to his/her credit status and/or his relative banker score. In an exemplary embodiment, the credit status is checked during each round, while the banker score eligibility is checked every ten rounds. Optionally, if the banker lacks credit he/she may add additional sums of money without losing the role of banker. Alternatively, when the bankers credit goes beneath a predetermined level, the player serving as banker is replaced. Thus, players are encouraged to deposit larger sums of money in their credit accounts.

When the banker leaves the game or is otherwise replaced, another banker is appointed from among the players. If all the players except one leave the game, the remaining player is moved to wait state 54.

It is noted, that in some embodiments of the invention, users may enter and leave games after any round regardless of when they most recently were assigned the banker role. The methods of some embodiments of the present invention divide the role of banker between the users evenly even when users may enter and leave games freely after any round.

Referring in more detail to checking (60) the credit account of the user with the highest score, in some embodiments of the invention, in order to play as banker the user must have sufficient money in his/her credit account to cover the maximal possible winnings of all the players currently playing in a single round. Alternatively, the user must have sufficient money to cover the maximal possible winnings of one or more additional players or the maximal number of players of the game in a single round, so that in case players join the game there is no need to replace the banker. Further alternatively or additionally, the user must have sufficient credit to cover winnings of a predetermined number of rounds.

In some embodiments of the invention, the user must have an additional credit margin such that a small loss in one round will not bring the bankers credit below the required level. Alternatively or additionally, when the chances of the banker losing more money than they have in their credit account is relatively small and/or the amount missing in the bankers account is relatively small, server 22 allows the banker to perform one or more additional rounds. In case the banker does lose money beyond that available in the banker's account, the losses are covered by server 22. In some embodiments of the invention, the banker may purchase before rounds in which he/she does not have sufficient credit, an insurance policy from server 22 which covers the banker losses beyond the sums in the users account, in case such losses occur.

Alternatively or additionally, the user becoming banker determines the maximal wager allowed while the user is banker according to the user's desires and/or credit level. Optionally, the maximal wager must be between predetermined limits in order to prevent sharp changes in the maximal wager when the banker changes. In some embodiments of the invention, the maximal wager changes automatically with the rounds of the game responsive to the banker's credit level.

Some multi-user games may have a maximal number of players. Various methods, as are now described, may be used when more players than allowed by the game rules wish to play the game. In some embodiments of the invention, when a player wants to join a game which is already being played by its maximal number of players, the player is placed on a waiting list until one of the other players leaves or until still another player wishes to join the game. Alternatively or additionally, for at least some of the games, the players of the game are split into two groups each of which plays the game separately. In some embodiments of the invention, server 22 randomly splits the players into two groups and bankers are chosen again in each group separately (optionally giving preference to the current banker in his/her group). Alternatively, server 22 determines which of the players currently playing as a regular player has the highest banker score and if that player has a higher banker score than the newcomer player, he/she is offered to become banker in a newly formed group comprising him/her and the newcomer. If the newcomer has a higher banker score, the player with the lowest banker score or any other player, for example a volunteer or a randomly chosen player, is moved to the new group with the newcomer. Alternatively, the current banker is moved to the new group with the newcomer and a replacement banker is chosen for the current group. Further alternatively or additionally, if the new comer has a higher banker score than the current banker, the banker is moved out of the game and the newcomer replaces the banker.

In some embodiments of the invention, if a newcomer arrives when there are two or more groups which are not full to their maximal capacity, the newcomer is entered randomly to one of the groups. Alternatively, the newcomer is added to the group with the least or the most players. Further alternatively, the newcomer is entered to the group in which he/she is closest to becoming banker or farthest from becoming banker. Alternatively or additionally, the group is selected responsive to whether the newcomer has sufficient credit to play as banker. In some embodiments of the invention, the newcomer is offered to pay a small commission for entering the group of his/her choice, for example, the group in which he/she is closer to becoming banker. Optionally, the user is provided with a list of all the groups currently available and the nicknames and/or credit scores of the players in each group. In some embodiments of the invention, a user may request not to be in the same group with a user that he usually loses to or who is a relative of his.

In some embodiments of the invention, the splitting of gamblers into separate groups is performed based on the bankers scores and/or available credit of the players, for example, so as to form homogeneous or heterogeneous groups. Alternatively or additionally, the players are notified that they must be split and they determine how the split is performed.

In some embodiments of the invention, server 22 provides clients 26 with an indication of the estimated number of rounds they must wait until they will become banker. Optionally, the estimated number of rounds is displayed only if the player is relatively close to becoming banker. Alternatively or additionally, any other strategy for displaying statistics is used in order to convince the users to continue playing.

In some embodiments of the invention, the banker score is a function of the total sum the player spent in the casino. Alternatively or additionally, the banker score is a function of the total number of rounds in which the player participated. Further alternatively or additionally, the banker score is a function of the balance of winnings or losses of the player. For example, the more money the player lost in the casino, the higher his/her banker score. Further alternatively or additionally, the banker score is a function of the time in which the player was connected to server 22 and/or was playing real games in server 22.

In an exemplary embodiment of the invention, the player's banker score is equal to the sum of the wagers the player placed in games of the casino, minus the sum of the wagers the player received when operating as banker. In an exemplary embodiment of the invention, the player's banker score is equal to the number of play rounds in which the player played in the casino. Optionally, each game has a respective weight and each round of a game played by the player raises the player's banker score by the respective weight of the game. In some embodiments of the invention, the casino sets the weights of the games according to the odds of the games (the worse the odds for the player the higher the weight of the game) and/or according the popularity of the games. For example, when the use of a game is relatively low, the casino may raise the weight of the game. Optionally, the casino automatically adjusts the weights of the games according to the use statistics of the games.

In some embodiments of the invention, instead of a single banker score, the user has a separate banker score for each specific game type (or each game). Optionally, the game-dependent banker scores are managed in addition to the general banker score and the score used in a specific game is a function of the general score and the specific score of the game. In some embodiments of the invention, the game dependent scores are accumulated during the specific game currently being played and are lost when the player leaves the game or at the end of the day. Alternatively, the game dependent scores are long lasting.

In some embodiments of the invention, the function determining the banker score gives more weight to money spent recently and/or to rounds in which the player recently participated. For example, in some embodiments, double weight is given to occurrences in the current playing session. Alternatively or additionally, the playing of certain games are given more weight than to other games in calculating the banker score of the player. For example, playing of no-house games may be given less weight (or even no weight) than is given to games played against a banker.

In some embodiments of the invention, the managing of the banker score is directed toward allowing each user to be banker for an amount of time which brings the odds of the user to win in the casino to be equal to the odds of losing. Alternatively, the managing of the banker score is directed toward minimizing the actual losses of users in the casino.

In some embodiments of the invention, the player may buy from the casino banker points which are added to the banker score of the owner of the points. Alternatively or additionally, the casino distributes banker points for promotion and/or as prizes to frequent players. For example, large expenditures during a predetermined period may grant a user a bonus of banker points. In another example, a lottery providing the winner with banker points is performed between visitors of a lowly used and/or newly introduced game of the casino. In some embodiments of the invention, banker points are personal and may not be transferred to other users. Alternatively, users may transfer to each other banker points (which are deduced from their banker score) for free or for a sum. In some embodiments of the invention, server 22 hosts a banker point market in which users can buy and sell banker points to each other. Alternatively or additionally, server 22 buys banker points from the users upon their request.

In some embodiments of the invention, one or more games of the casino allow users to gamble on their banker points. Optionally, the role of banker in these games is given using any of the methods used in the real casino games.

Alternatively or additionally to determining the player to whom the role of banker is offered based on the banker score, the game players choose the banker among themselves, for example in a periodic vote. Further alternatively or additionally, the banker is chosen at least partially randomly. For example, the player to be offered the banker role may be chosen randomly with odds determined based on the banker scores of the players. Further alternatively or additionally, the role of banker is auctioned between the players. The auction may be based on a flat sum per play round or on a percentage of the net or total winnings of the banker.

In some embodiments of the invention, the banker score is a function of the combined actions (e.g., rounds played, sums spent) of the player regardless of the time passing since the actions occurred and regardless of the amount of time the player was banker. Thus, preference is given to frequent and heavy gamblers. Alternatively, the banker score gives more weight to recent actions, so as to devaluate the fruits of old actions.

In some embodiments of the invention, the banker score is reduced based on the time in which the player acted as the banker. Optionally, the banker score is reduced based on the number of rounds in which the player acted as banker and/or the total wagers of those rounds. Alternatively or additionally, the banker score is reduced based on the total and/or net winnings of the player as banker.

In some embodiments of the invention, the banker score is a function of the odds of the games played by the user. Optionally, the banker score assigned to the user is directed to bringing the user to a predetermined odds level, e.g., 50:50. For example, a user who provided $100 of wagers at odds of 40:60 is entitled to a banker score which allows the user to play as banker for a number of rounds equivalent to placing $100 of wagers at odds of 60:40, i.e., receiving $100 of wagers as banker. The user may alternatively use his/her banker score in a game with different odds in which case the user is entitled to receive more or less wagers.

Table 1 below summarizes an exemplary calculation of a banker score of a user, in accordance with an embodiment of the present invention.

In some embodiments of the invention, for each game played by the user, the user's banker score table lists the name of the game, the odds of the game, the sum placed as wagers by the user or the wagers the user received as banker. Accordingly, the banker score of the game is calculated as the average amount of money which the user would lose. The total banker score is equal to the sum of the scores of all the games.

In some casino games, such as blackjack, the player's odds depend on the playing strategy of the player. In some embodiments of the invention, in strategy dependent games, the user's odds in the game used in calculating the user's banker score, depend on the user's strategy. If the user plays the game skillfully, the odds are considered more in the user's favor and the user gets a lower banker score. Alternatively, if the user plays skillfully the user receives a higher score as a bonus for skillful playing. Optionally, when the user takes on a portion of the banker role, as described hereinbelow, the sum placed is equal to the portion of the wagers received by the user.

TABLE 1

| game | role | odds | sum placed | score |
|---|---|---|---|---|
| roulette-1 zero | player | 48.964:51.036 | $75 | 75*.02702 = 2.0265 |
| EGM | player | 45:55 | $223 | 22.3 |
| roulette-2 zeros | banker | 52.6315: 47.3685 | $173 | 173*−.05263 = −9.105 |
| total score | | | | 15.2215 |

In some embodiments of the invention, the procedures for playing single-user games are similar to those for playing multi-user games. Optionally, users entering a single-user game are paired, for example according to their entrance times, and one of the players in each pair is elected to act as banker. In some embodiments of the invention, if neither of the players in a group can or wants to be the banker, the role of banker is offered to users acting as regular players in other groups of the same game.

Alternatively or additionally, when a player enters a single-user game in which one or more groups are already active, the role of banker for the newcomer is offered to one of the active bankers which has sufficient credit to serve as banker for more than one player. If all the active bankers decline receiving the role of banker for the additional newcomer, another group is formed. Optionally, the bankers may have up to a maximal number of players.

In some embodiments of the invention, when the banker stops playing or the turn of the player to operate as banker is over, the role of banker for all the players serviced by the leaving banker is offered as a package deal to one of the current players. Optionally, if none of the current players is interested in the banker role for all the players the role is offered to players in other groups of the same game and/or to other players in the casino. Alternatively, if no player who is willing to operate for the entire group is found in the group, the group is split into two or more groups which have different bankers. Further alternatively, the role of banker is offered to the player in the group who has the highest banker score and that player may choose the number of players he/she wishes to service.

In some embodiments of the invention, the procedures for playing jackpot games are similar to the procedures described above with relation to multi-user and/or single-user games. Optionally, a user receiving the role of banker in a jackpot game pays the casino for the amount of money currently in the jackpot. Optionally, if a player receives the entire jackpot or a large part thereof the banker must replenish the jackpot to a minimal level. In some embodiments of the invention, if the jackpot reaches a maximal level the wagers of players enter directly to the banker's account rather than to the jackpot. When the banker finishes his turn as banker, either under the initiative of the banker or because another user is waiting to receive the turn of banker, the casino pays the banker for the current amount of money in the jackpot. Alternatively, when a user wants to leave the role of banker, the user must wait until another user desiring to accept the role of banker will take over the jackpot and pay the leaving user for its contents. Further alternatively or additionally, the leaving banker may take the jackpot money and a new banker puts in the minimum amount of money to the jackpot.

In some embodiments of the invention, server 22 supplies a chat room for each game in the casino such that the players playing the same game can talk to each other. Alternatively or additionally, chat rooms are supplied for each group playing against a single banker. Optionally, the banker also participates in the chat room. Alternatively, the banker is not connected to the chat room so that the other users can discuss strategies against the banker. Further alternatively, two chat rooms are supplied, one which is accessible by the banker and one which is not accessible by the banker.

In some embodiments of the invention, the clients 26 display the apparatus of the game played, along with the names or nick-names of the other players and the banker of the game. Thus, players know the names of the other players and can talk to them in the chat room. Players can thus determine for themselves that they are playing against each other and not against the casino.

In some embodiments of the invention, server 22 provides interested users with the rules of each game and/or the winning chances and/or ratios of the games. In some embodiments of the invention, server 22 keeps track of the play strategy of the user and responsive to the users request (optionally for payment) provides the user with tips to improve his/her play strategy. For example, a player of blackjack who always draws a card when he has 15 or less may be given a hint to check the cards of the other users and accordingly to determine the chances of receiving a seven or less.

Figure 3:
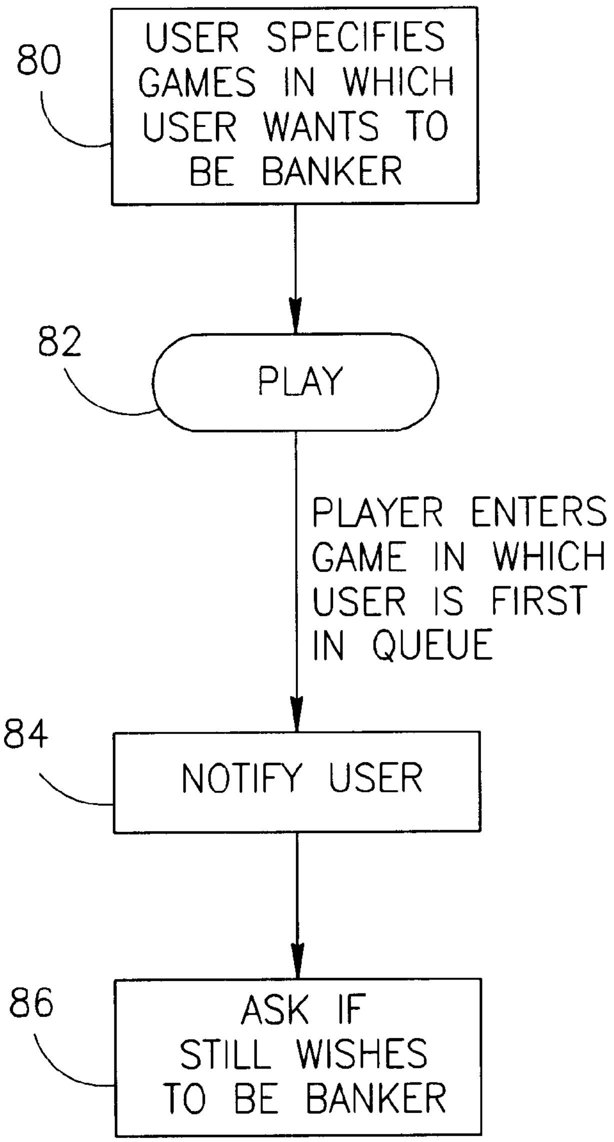
FIG. 3 is a flowchart of the actions of a player entering a casino, in accordance with another embodiment of the present invention.

FIG. 3 is a flowchart of the actions of a player entering the casino of server 22, in accordance with another embodiment of the present invention. In the method of FIG. 3, each game has a banker queue in which users who want to be bankers of the game register. Optionally, when a user connects to server 22 he/she is asked to specify (80) the games in which he/she desires to be banker. In some embodiments of the invention, the player may select groups of games by stating the type of games (e.g., all blackjack games, all EGMs) or stating all games. Alternatively or additionally, the player may request to register in the banker queues of all the games which require at least (or at most) a specific sum in order to act as banker. In some embodiments of the invention, the player may register in up to a maximal number of queues. Alternatively or additionally, server 22 automatically selects the queues in which the player is registered randomly and/or based on previous player selections. In some embodiments of the invention, the queues are selected based on the players currently playing games. For example, a player may be interested to play against a user who he formerly lost to or may not want to play against such a user. Optionally, a user may request to use his turn to be banker when a specific user is playing or is not playing.

The player may then select to play (82) any of the games as a regular player and/or may play a demonstration version of one of the games. In each game, when one or more players wish to play as regular players, the first player in the banker queue of the game is notified (84) and called upon to act as banker. Optionally, the player is asked (86) if he/she still wishes to act as banker. Alternatively, the game begins immediately with the player from the queue as banker, provided the player has sufficient credit to serve as banker. Optionally, when the user offers a wager which brings him/her beneath the minimum required for one of the banker queues in which he/she is registered, server 22 notifies the user and asks if he/she wants to continue. Optionally, if the user goes beneath the credit level required for a specific queue the player is prompted to provide additional credit. If additional sums are not supplied the user may be removed from the queue. Alternatively, the user may remain in the queue in case winnings in the games played (82) by the user bring the credit level of the user back above the required level before the user's turn in the queue is reached.

In some embodiments of the invention, the order in the queue is based on the time of registration. Optionally, users who play as regular players while waiting in the queue are pushed ahead in the queue a predetermined number of places. In some embodiments a player acting as banker in another game gets pushed back in the queue or is thrown out of the queue completely. Optionally, a player may register again in one or more queues only after the player finishes operating as banker. Alternatively, the player may remain in one or more queues while operating as banker. Optionally, the player may operate as banker concurrently in a plurality of different games. Alternatively or additionally, the player may not become banker in a second game within a predetermined time from being banker in the first game. Alternatively or additionally to organizing the queue according to arrival times, the order in the queue depends on the banker score of the player.

In some embodiments of the invention, the player may accept the role of banker in one game while continuing to play another game as a regular player. Optionally, client 26 splits the display and shows both games and/or the user may switch between displaying the games. Alternatively, client 26 shows periodic updates of the status of the game in which the player is the banker, particularly when no actions are required from the player when operating as banker. Alternatively, the player must leave any other game in which he/she is participating in order to become banker.

In some embodiments of the invention, each player in the queue may operate as banker for up to a predetermined number of rounds of the game. Alternatively, players may operate as bankers until they receive a predetermined sum as wagers. Further alternatively or additionally, the span of time for which a player may operate as banker is a function of the gains of the banker. Alternatively or additionally, the span of time, number of rounds or accrued wagers for which the player may operate as banker is a function of the player's banker score. For example, the number of rounds which the player may operate as banker may be a linear function of the player's banker score. In some embodiments, acting as banker reduces the banker score of the player. Optionally, the player may continue to operate as banker until the banker score goes beneath a predetermined level or reaches zero.

In some embodiments of the invention, if a player's turn arrives in the queue at a time in which the player does not have sufficient credit, the player is called to immediately add credit or lose the turn for acting as banker. Alternatively, the player remains at the head of the queue and immediately upon having enough credit the player's turn arrives.

In some embodiments of the invention, when the player's turn to act as banker arrives, the player may postpone using the turn until more favorable conditions in the view of the player are reached. For example, the player may wait until expert gamblers leave the game and/or until more or less players participate in the game. Alternatively, when the player's turn to be banker arrives he/she must use the turn immediately or forego the turn.

In some embodiments of the invention, if the player leaves the casino of server 22 he/she is removed from all queues. Optionally, the client 26 of the player must actively send player initiated signals, e.g., playing in other games, in order to prove that the player has not left the casino.

Alternatively, a user may register to act as banker off-line, i.e., without being connected to server 22. Optionally, the user may state credit limits between which he/she is interested in acting as banker and/or a maximal time period for which he/she is interested in being the banker. Alternatively or additionally, the user states the maximal wager level for which the user is willing to act as banker. Optionally, server 22 keeps a log of the events occurring when the off-line user operated as the banker, such that upon connecting to server 22 the user receives a full report of the gambling against him/her.

In some embodiments of the invention, client 26 displays the number of players preceding the user in the queue and/or the estimated time until the user's turn arrives, for each queue in which the user is registered. In an exemplary embodiment of the present invention, the estimate takes into account the credit of the players ahead in the queue and/or the likelihood that they will leave the queue before their turn arrives. Alternatively, players are not notified their place in the queue so as to keep them in suspense. Further alternatively, the player may purchase the service of being notified of the place in the queue for a small commission paid to the casino.

In some embodiments of the invention, the role of banker is split between a plurality of users. Optionally, each of the plurality of users holds a percentage of the banker role, i.e., receives that percentage of the players wagers and must pay that percentage of the players winnings. Alternatively, the ratio between the percentage of the winnings paid by a user and the percentage of wagers received by the user is a function of the user's banker score.

In some embodiments of the invention, when a player is offered the banker role he may choose to accept the entire banker role or a portion of the banker role. For example, the player may accept a fixed percent, e.g., 50%, of the banker role or may accept a portion of the banker role allowed by the players credit. The remaining portion of the banker role is offered to the next in line to being offered the banker role (in the queue or with the next highest banker score). Optionally, the next in line player may accept any part of the remaining portion of the banker role. The remaining portion is then offered to the next in line user until the entire banker role is divided between the users. Alternatively or additionally, the player taking only part of the banker role may invite one or more friends to take the remaining portion.

Further alternatively or additionally, a group of users register together in a banker queue and are offered the role of banker together when their turn arrives. Optionally, in those embodiments in which the eligibility to receive the role of banker depends on the banker score of the user, the eligibility of the group of users is based on the sum or average of their banker score. Alternatively or additionally, the eligibility of the group is determined based on the banker score of the user with the lowest score. Optionally, in those embodiments in which the banker score of the user is reduced when acting as banker, when one of the users remains without banker points the other users in the group provide their banker points instead.

In some embodiments of the invention, each user must have at least a predetermined percentage of the banker role, which may depend on the specific game. Alternatively or additionally, the number of users splitting the banker role is limited to a predetermined number, possibly different for different games. In some embodiments of the invention, users holding a portion of the banker role beneath a predetermined percentage (which may be up to 100%) may also act as regular players and/or as bankers in other games.

In some embodiments of the invention, the division of the banker role is changed dynamically based on changes in the credit status of the players holding the banker role. For example, if the credit status of the user with the highest banker score improves during the progress of the game, her portion of the banker role is enlarged on account of the user with the lowest banker score. If, for example, the credit of one of the users goes beneath that required by his portion of the banker role, his portion is reduced and is given to one of the other users. Optionally, in accepting the banker role, users state a range of portions which they are willing to accept and within these ranges the banker portions are adjusted automatically.

The division of the banker role between a plurality of users can be advantageous for substantially all casino games. It is, however, particularly useful in those games in which the sums which the banker can lose in a single round are very high and are not always held by a single user. For example, a roulette table with a payout ratio of 36:1 in which five players each place wagers of $100, could theoretically require a payout of $18000. Thus, in some embodiments of the invention, the users operating as bankers must have a combined credit of at least 20, 50 or even 150 times the maximal wages allowed in the game.

In some embodiments of the invention, when the line for becoming banker in a queue of a game is relatively long, the banker role is split between a plurality of users in order to allow the offering the role of the banker to more of the users. In some embodiments of the invention, all the partial bankers are replaced at once. Alternatively, each partial banker is replaced separately without relation to the other partial bankers.

In some embodiments of the invention, the banker role is divided between some or all the users currently interested in being the banker. Optionally, each user receives an equal share of the banker role, provided the user has sufficient credit. In some of the embodiments of the invention in which the banker score of the user goes down with the extent for which the user operates as banker, e.g., according to the amount of wagers the user receives as banker, the user must also have a banker score which entitles the user to operate as banker. Optionally, users not having sufficient credit are not given a portion of the banker role. Alternatively, users not having sufficient credit are given a portion according to their credit abilities. When many users register as interested in being banker the portion of the banker role that each user receives is very small, allowing the user to gain from acting as banker without taking substantial risks.

Alternatively to selecting one or more banker for each game separately, the banker role of the entire casino or of departments thereof (e.g., jackpot department, blackjack department, combined banker department) is divided between a banker group of users which serves as banker for all the games of the casino. Optionally, any user of the casino having a credit account with sufficient credit, is automatically added to the banker group. Before any round of a game, server 22 determines which users are included in the banker group and have sufficient credit and/or a sufficient banker score for the specific game round.

Server 22 may make money in various ways. In some embodiments of the invention, server 22 invests the money in the users credit accounts and enjoys the interest. Alternatively or additionally, server 22 displays ads to the users. In some embodiments of the invention, the casino of server 22 receives a commission which is a fixed percentage (e.g., 1.5%) of the wagers offered by players in the games. Alternatively or additionally, the casino receives a percentage of the winnings of the bankers in those rounds in which they win. By taking the commission of the casino from the bankers and not from the players, the game ratios after commissions remain the same for the players as in other casinos which do not take a playing commission. Optionally, the percentage of the commission is such that it does not bring the banker role beneath the 50% winning chance. Further alternatively or additionally, a commission is taken from the winnings of players in rounds in which they win or from losses in the rounds in which they lose. Alternatively, the casino receives a percentage of the net income of users when they draw money from their account.

Figure 4:
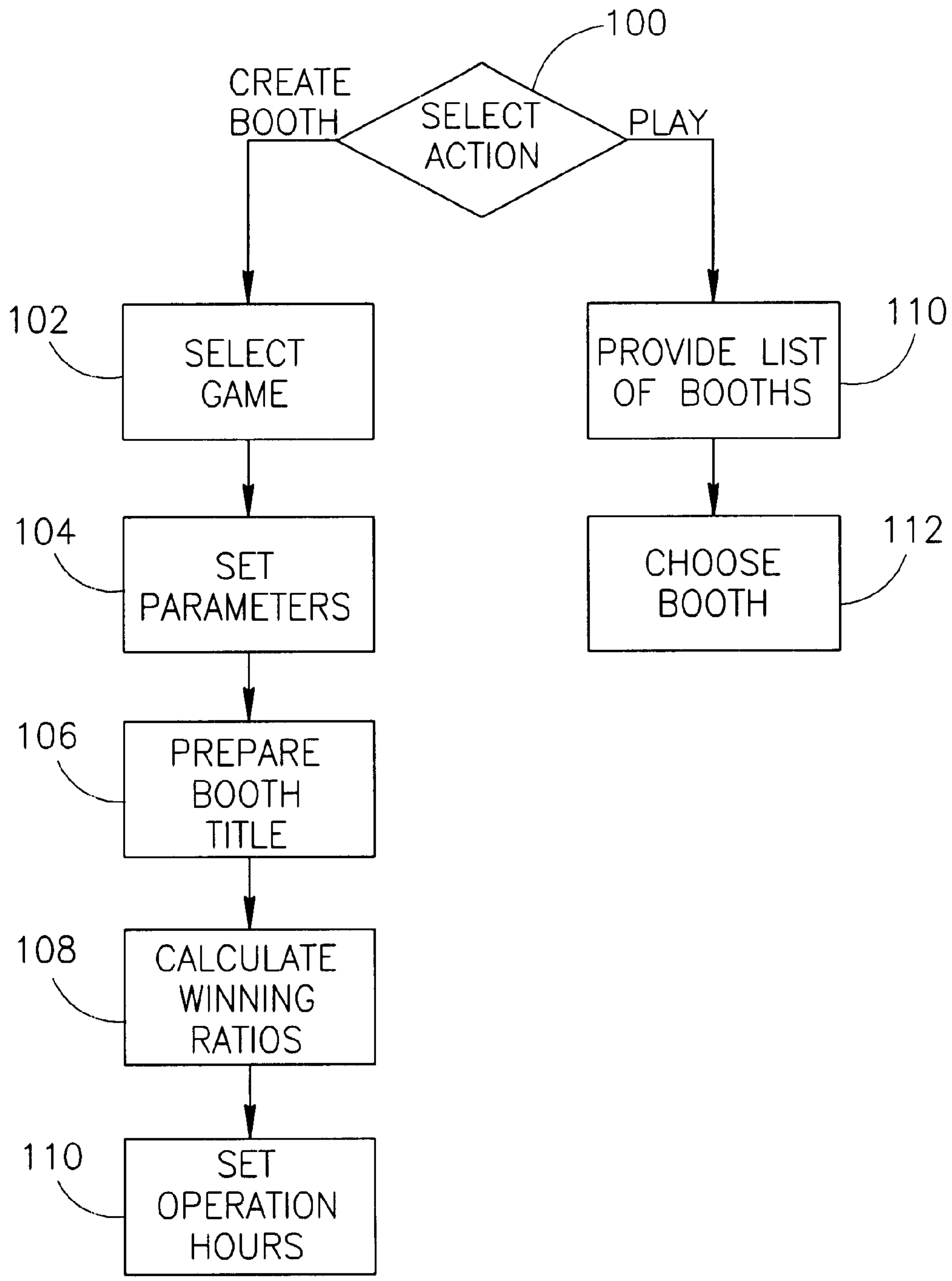
FIG. 4 is a flow chart of the actions of a user entering a casino, in accordance with an embodiment of the present invention.

FIG. 4 is a flow chart of the actions of a user entering the casino of server 22, in accordance with another embodiment of the present invention. At the entrance to the casino, the user may select (100) to put up a playing booth or to go play at one of the booths. In putting up a playing booth, the player selects (102) a game (e.g., blackjack, video poker). The user then sets (104) the values of one or more parameters of the booth, such as the number of players who may play concurrently, the minimal wager and/or the maximal wager. The maximal wager is limited by the credit of the user. Optionally, the maximal wager is stated as a function of the users credit, and changes with the users credit. The parameters optionally include changes in the playing rules, such as changes in the winning ratios and/or game specific rules, e.g., the number of zeroes on a roulette table or the winning chances of a slot machine. In some embodiments of the invention, the user may provide free gifts to gamblers entering the booth and/or to frequent visitors. Alternatively or additionally, the user may assign different parameters to different gamblers, e.g., to newcomers versus frequent users. In some embodiments of the invention, the parameters include the credit rules of the booth, e.g., whether cheques not cleared yet are accepted.

Optionally, the user may upload graphics to be used in the booth. In some embodiments of the invention, the user prepares (106) a title (or name) of the booth which is meant to attract players. In some embodiments of the invention, server 22 calculates (108) the winning ratios of the booth to aid the user in planning the booth and/or to display to players contemplating a visit in the booth. For example, in setting up an EGM booth with certain winning conditions and prizes, casino 22 calculates the odds of the booth such that the user can change the winning conditions or prize amounts to better fit the odds desired for the booth. Alternatively or additionally, the user may receive statistics of user habits which may aid in setting the parameters of the booth.

In some embodiments of the invention, the user sets (110) the operation hours of the booth. The operation hours are optionally stated based on the time of day and/or based on whether the user is connected to server 22. In some embodiments, the user may request to be notified each time a user enters the booth and/or that the booth be displayed to the user each time a player enters the booth. In some embodiments of the invention, the user may request to receive a notification when the user's credit goes beneath a predetermined level and/or above a predetermined level. The message may be sent using e-mail, telephone, a cellular messaging method and/or any other messaging method known in the art. In some embodiments of the invention, a chat connection is established between the booth owner and users entering the booth.

In some embodiments of the invention, the user may advertise that partners are wanted in running the booth so that the booth can offer larger winnings. Alternatively or additionally, server 22 manages an entrepreneur meeting room in which users interested in putting together booths may meet to contemplate common ventures. In some embodiments of the invention, the partnership rules are governed by server 22 such that the winnings and losses are evenly split between the partners according to their shares in the booth.

In some embodiments of the invention, users may program new gambling games which are to be used in their booth. In some embodiments, the new gambling games are programmed in a general purpose programming language, such as Java or C++. Alternatively or additionally, users interested in programming their own booth may download a user friendly preparation kit which aids them in preparing the booth and states the programming rules to which the booth must adhere. In some embodiments of the invention, server 22 has the new booth tested before it is opened for access by clients 26.

In some embodiments of the invention, each user is entitled to set up at most a predetermined number of booths. Alternatively or additionally, users pay rent to the casino of server 22 for the time in which their booth is active or at a flat rate. In some embodiments of the invention, users may pay additional sums to receive a better booth location and/or a more attractive (e.g., larger, colorful) advertisement of their booth. In some embodiments of the invention, the number of booths to which a user is entitled and/or the price which the user must pay for the booths depends on the banker score of the user. In some embodiments, popular booths are given extra reduction and/or bonuses.

In some embodiments of the invention, users interested in playing are provided (110) with a list of available booths and/or a display map of booths. Optionally, the booths are organized according to the types of games they provide, the maximal prizes they provide and/or any other parameters of the booths. The user browses through the list and/or display and chooses (112) a booth in which to play. Alternatively, the user searches for a booth that most suits the user's desires. The search can be based on one or more parameters, such as the gain ratios, the type of the game, the minimal wager, the maximal wager and/or any other parameter of the booths. In some embodiments of the invention, the order in which the booths matching a user query are displayed to the user is chosen randomly and/or according to a match rating. Alternatively or additionally, the order of display depends on the amount of money the booths pay casino 22 and/or on the popularity of the booths.

In some embodiments of the invention, one or more of the parameters described above is being configurable by booth owners are open for determination by bankers chosen in accordance with the embodiments described with relation to FIGS. 2 and/or 3 above. For example, in some embodiments, the banker may determine in his turn whether to accept wagers from players with bad credit and/or whether to provide free gifts (e.g., coupons) to bidders of relatively high wagers.

Optionally, when the role of banker is held by a plurality of users, the user with the largest percentage performs banker playing and/or decisions. Alternatively, the users holding the banker role make the decisions together and/or choose a representative. Further alternatively, the user with the portion with the best or worst odds makes the decisions. Further alternatively or additionally, some of the decisions, e.g., frequent playing decisions, are performed randomly by server 22.

Although the above description relates to an Internet server 22 and clients 26 carrying a downloaded software, substantially any other communication network, such as, local area or other private networks, voice and/or text based cellular networks, satellite networks, cable TV networks and/or a Wireless Application Protocol (WAP) network. In an exemplary embodiment of the invention, server 22 communicates with clients 26 over a network as described in U.S. Pat. No. 5,999,808 to LaDue, the disclosure of which is incorporated herein by reference, may be used. Alternatively or additionally, hybrid networks may be used in which some of the users connect to server 22 over computer networks and others connect to server 22 over cellular and/or cable TV networks.

In some embodiments of the invention, instead of using a proprietary downloaded software, clients 26 use standard Internet browsers. In some embodiments of the invention, some of the methods described above are employed in a terrestrial casino. It is noted, however, that on-line casinos provided over networks are different than terrestrial networks. For example, on-line casinos are in a highly competitive environment in which the user does not need to get out of his/her seat in order to move to the competitors.

In some embodiments of the invention, the casino of server 22 also manages games in which the user plays against the casino. Optionally, games against the casino are located in a different area than the games against other users. Alternatively or additionally, when no volunteers are willing to act as the banker, the casino or a subsidiary thereof takes on the role of casino. Alternatively or additionally, the casino of server 22 participates in same of the casino games as a player. Optionally, the casino participates as a player when at least a predetermined number of users are playing. Alternatively, the casino participates as a player when only a single user wishes to play a game. Optionally, the casino and the user split between them the role of banker.

In some embodiments of the invention, server 22 provides private group tables in which a plurality of users coming as a group play games according to their own rules. Optionally, playing in the private room tables entitles the users to receive banker points, separately and/or together as a group. Alternatively, activities in private tables are not considered in determining the banker score.

It will be appreciated that the above described methods may be varied in many ways, including, changing the order of steps, and the exact implementation used. It should also be appreciated that the above described description of methods and apparatus are to be interpreted as including apparatus for carrying out the methods and methods of using the apparatus.

The present invention has been described using non-limiting detailed descriptions of embodiments thereof that are provided by way of example and are not intended to limit the scope of the invention. It should be understood that features and/or steps described with respect to one embodiment may be used with other embodiments and that not all embodiments of the invention have all of the features and/or steps shown in a particular figure or described with respect to one of the embodiments. Variations of embodiments described will occur to persons of the art.

It is noted that some of the above described embodiments describe the best mode contemplated by the inventors and therefore include structure, acts or details of structures and acts that may not be essential to the invention and which are described as examples. Structure and acts described herein are replaceable by equivalents which perform the same function, even if the structure or acts are different, as known in the art. Therefore, the scope of the invention is limited only by the elements and limitations as used in the claims. When used in the following claims, the terms "comprise", "include", "have" and their conjugates mean "including but not limited to".

What is claimed is:

1. A method of gambling in a casino, comprising:

playing one or more gambling games by a user;

assigning to the user a banker score responsive to the extent of playing of the one or more gambling games by the user; and offering to the user the position of banker in a casino game, in which one or more players play against the banker and the banker has better odds than the players, responsive to the banker score of the user.

2. A method according to claim 1, wherein playing one or more gambling games by the user comprises playing games against a banker.

3. A method according to claim 2, wherein playing games against a banker comprises playing against other players serving as the banker.

4. A method according to claim 1, wherein playing one or more gambling games by the user comprises playing games which do not include a banker.

5. A method according to claim 1, wherein assigning the banker score comprises assigning a score which depends on the total wagers of the user in the casino.

6. A method according to claim 1, wherein assigning the banker score comprises assigning a score which depends on the number of rounds played by the user in the casino.

7. A method according to claim 1, wherein assigning the banker score comprises assigning a score which depends on the net losses of the user in the casino.

8. A method according to claim 1, wherein assigning the banker score comprises assigning a score which depends on the previously accrued revenues of the user in acting as banker in the casino.

9. A method according to claim 1, wherein assigning the banker score comprises assigning a score which depends on acts in a specific game for which the user wishes to act as banker.

10. A method according to claim 9, wherein assigning the banker score comprises assigning the banker score substantially only based on acts performed in playing the game for which the user wishes to act as banker.

11. A method according to claim 1, wherein assigning the banker score comprises assigning the banker score at least partially based on acts in at least one previous session of the user in the casino.

12. A method according to claim 1, comprising allowing the user to receive or transfer banker points which are added or subtracted from the users banker score.

13. A method according to claim 1, wherein offering the user the position of banker responsive to the banker score of the user comprises offering the position of banker to the user with the highest banker score among a plurality of users interested in acting as banker.

14. A method according to claim 1, wherein offering to the user the position of banker responsive to the banker score of the user comprises offering the position of banker to the user if the banker score of the user is above a predetermined threshold.

15. A method according to claim 1, wherein offering to the user the position of banker comprises offering the position of banker to the user, provided the user will have a sufficient amount of credit when becoming banker.

16. A method according to claim 1, wherein offering to the user the position of banker comprises offering the banker role to a plurality of users, each user receiving a percentage of the banker role.

17. A method according to claim 1, wherein offering to the user the position of banker comprises offering the banker role to an extent which equalizes the winning and losing odds of the user in the casino.

18. A method according to claim 1, wherein playing the one or more gambling games comprises playing software provided gambling games.

19. A method according to claim 18, wherein playing software provided gambling games comprises playing games provided over a communication network.

20. A method according to claim 1, wherein playing one or more gambling games comprises playing well-known casino games.

* * * * *